United States Patent [19]

Spinney

[11] Patent Number: 5,183,505

[45] Date of Patent: Feb. 2, 1993

[54] CELLULAR CONCRETE

[75] Inventor: Stewart C. Spinney, Effort, Pa.

[73] Assignee: Concrete Technology, Inc., Stockertown, Pa.

[21] Appl. No.: 889,481

[22] Filed: May 27, 1992

[51] Int. Cl.$^5$ .................. C04B 24/08; C04B 28/26
[52] U.S. Cl. .................... 106/672; 106/662; 106/677; 106/681
[58] Field of Search ............... 106/662, 672, 677, 681

[56] References Cited

U.S. PATENT DOCUMENTS

| | | | |
|---|---|---|---|
| 112,929 | 3/1871 | Kreischer | 106/679 |
| 1,751,430 | 3/1930 | Thomson | 106/680 |
| 1,932,971 | 10/1933 | Huttemann et al. | 106/700 |
| 2,053,842 | 9/1936 | Rice | 106/646 |
| 2,364,344 | 12/1944 | Connell et al. | 106/664 |
| 2,432,971 | 12/1947 | Ruthman et al. | 106/674 |
| 2,598,981 | 6/1952 | Denning | 106/675 |
| 2,864,714 | 12/1958 | Dixon et al. | 106/677 |
| 3,041,190 | 6/1962 | Griffith et al. | 106/672 |
| 3,062,669 | 11/1962 | Dilnot | 106/674 |
| 3,192,060 | 6/1965 | Tilsen | 106/709 |
| 3,563,930 | 2/1971 | Stram et al. | 524/5 |
| 3,573,941 | 4/1971 | Edwards et al. | 106/677 |
| 3,615,784 | 10/1971 | Cattanach | 106/646 |
| 3,625,723 | 12/1971 | Sicka | 106/679 |
| 3,663,287 | 5/1972 | Mizunuma et al. | 106/820 |
| 3,669,701 | 6/1972 | Biederman, Jr. | 106/706 |
| 3,852,084 | 12/1974 | Webster et al. | 106/710 |
| 3,867,159 | 2/1975 | Ergene | 106/646 |
| 3,963,507 | 6/1976 | Kuramoto et al. | 106/674 |
| 3,989,534 | 11/1976 | Plunguian et al. | 106/646 |
| 4,084,980 | 4/1978 | Motoki | 106/601 |
| 4,097,422 | 6/1978 | Markusch | 521/154 |
| 4,113,913 | 9/1978 | Smiley | 428/312.4 |
| 4,116,703 | 9/1978 | Stempin et al. | 106/601 |
| 4,142,910 | 3/1979 | Kraemer et al. | 106/672 |
| 4,268,316 | 5/1981 | Wills, Jr. | 106/707 |
| 4,341,876 | 7/1982 | Kreuer et al. | 106/122 |
| 4,351,670 | 9/1982 | Grice | 106/672 |
| 4,568,390 | 2/1986 | Gelbman | 106/718 |
| 4,673,437 | 6/1987 | Gelbman | 106/718 |
| 4,683,019 | 7/1987 | Motoki | |
| 4,900,359 | 2/1990 | Gelbman | 106/681 |

FOREIGN PATENT DOCUMENTS

| | | |
|---|---|---|
| 144247 | 1/1951 | Australia. |
| 2547908 | 4/1977 | Fed. Rep. of Germany. |
| 593309 | 10/1947 | United Kingdom. |

*Primary Examiner*—Karl Group
*Assistant Examiner*—Anthony J. Green
*Attorney, Agent, or Firm*—Cohen, Pontani, Lieberman, Pavane

[57] ABSTRACT

A more economical, stable, non-shrinking cellular concrete is provided by the addition of cementitious or non-cementitious fines to a cellular concrete mix. The improved cellular concrete is attained by reducing the amount of cement and replacing it with an equal amount of cementitious or non-cementitious fines. The partial replacement of the more expensive cement for the less expensive fines results in a more economical choice of cellular concrete suitable for use in structural applications, for insulation purposes, and for use in producing lightweight aggregate.

36 Claims, No Drawings

CELLULAR CONCRETE

FIELD OF THE INVENTION

This invention relates to the field of concrete technology and to compositions useful in producing cellular (foamed) concrete and to a process for producing same. The invention also relates to producing cellular concrete suitable for use in producing lightweight aggregate material therefrom, especially lightweight aggregate for use in poured concrete and concrete block mixes and for lightweight insulation mixes.

BACKGROUND OF THE INVENTION

Concrete, composed of cement, aggregate and water, is a well known building material having considerable compressive strength. There are multiplicities of application where low density concrete is a suitable, useful or desirable material since it has the advantage of light weight and favorable insulation properties.

In general there have been several methods to produce such low density concrete and lightweight aggregate. In one way, lightweight aggregate material, such as cinders available in ash heaps from coal-burning power plants, was used to produce such low density concrete products. However, a decade ago or more, when such cinders were no longer generally available, manufacturers substituted bloated slate, clays and shale, fly ash, pumice and the like which they produced in rotary kilns or sintering machines. While such kilned or sintered materials and methods using such heat-expanded materials are still currently in use, they are not very satisfactory or efficient as well as being increasingly very expensive due to material costs, fuel costs and labor costs. The expensive massive kilns or sintering equipment produce only relatively small amounts of product per working shift. Moreover, such heat-expanded aggregate making methods have not produced products with uniformly satisfactory properties. Besides requiring expensive and cumbersome machinery, heat-expansion processes create highly undesirable air pollution. Additionally, the specialized raw materials for producing such heat-expanded products are only available in certain limited geographic areas, often remote from the desired site for use.

Another manufactured lightweight aggregate is expanded slag. Hot dross is separated from the molten iron in steel production and is put in contact with water to cause bloating. Since the residue is a by-product, the aggregate is economical, but since it is dross it is neither uniform nor stable and therefore does not produce sufficiently uniform low density concrete.

Additionally, it has been suggested that low density concrete could be produced by making a "cellular concrete" by adding air-bubble containing foam to a concrete mix and trapping the air-bubbles therein. However, much of these bubbles are generally lost during the step in which the foamed composition is mixed with the concrete or during pouring of the concrete mix. The foamed compositions tend to break down or bubbles collapse and are lost during mechanical mixing of the compositions resulting in a large loss of air. Additionally, bubbles of the foamed composition tend to coalesce into each other and form relatively large and unstable air pockets, resulting in loss of cell integrity. Moreover, such cellular concretes have generally suffered from undesirable, unpredictable shrinkage and cracking during the curing or setting operation which tends to be erratic. All these factors tend to produce weakened cellular concrete. Also, such cellular concrete requires specialized on-the-job mixing apparatus, and the foam mix specifications must be tailorized for the necessary foam fluidity characteristics with increased water content needed to avoid undue loss of bubbles, rather than for the ultimate desired low-slump structural concrete mix specifications. Accordingly, such cellular concrete has found use primarily only in floor fills and roof deck applications, providing insulation and some modicum of fire protection, but due to the shrinkage and cracking or due to the need for specialized apparatus and the foam mix characteristics as described, conventional foamed concrete is generally unsuitable for use as a structural concrete.

One method of attempting to produce lightweight aggregate has been to provide a body of cured cellular concrete, breaking the body into fragments, coating the fragments with a thin layer of cement which is allowed to cure and incorporating the coated fragments in a cement matrix to form low density concrete. Such a method is disclosed for example in U.S. Pat. No. 4,351,670 issued Sep. 28, 1982 to Harold E. Grice. However, such products are not sufficiently stable and require a cumbersome process for preparation. In addition, such cellular concrete suffers from erratic curing or setting that results in setting-shrinkage or coalescing of cells and loss of cell integrity as discussed previously.

Moreover, the use of such cellular concrete to produce lightweight aggregate by heretofore employed methods has required the use of massive crushing equipment to transform the cellular concrete into suitable lightweight aggregate.

Another method of producing lightweight aggregate has been to add a colloidal solution or sol-gel of sodium bentonite, peptized calcium bentonite, attapulgite or a gelled silica, such as a sodium silicate $CaCl_2$ sol-gel, to a cellular concrete mix. Such a method is disclosed in U.S. Pat. No. 4,900,359 issued Feb. 13, 1990, to Lawrence F. Gelbman. Setting-shrinkage in the resulting cellular concrete is substantially eliminated as is cell coalescing so that cell integrity of the cellular concrete is maintained. This particular cellular concrete is characterized by an increased strength to weight ratio and therefore is much more suitable for use in structural applications as well as for insulation purposes. Additionally, this cellular concrete absorbs substantially no water in the cells since the cells have not coalesced and are not interconnected. Moreover, such cellular concrete may be converted to substantially uniform and stable lightweight aggregate by heretofore known crushing methods. However, such cellular concrete is still quite expensive to produce in commercial quantities because cellular concretes of this type require substantial quantities of cement, generally the costliest ingredient in cellular concrete.

It is therefore an object of this invention to provide an economically manufactured lightweight aggregate that can be produced in commercial quantities to meet the increasing demand.

SUMMARY OF THE INVENTION

It has been discovered that an economical, stable, non-shrinking cellular concrete can be produced by the substitution of cementitious fines, such as kiln dust, or non-cementitious fines, such as limestone, for a portion of the cement in a cellular concrete mix. The improved cellular concrete of this invention is characterized by a partial replacement of the expensive cement component with an equal amount of the less expensive fines. Such improved cellular concrete can then be crushed to produce a substantially uniform and lightweight aggregate.

DETAILS OF THE INVENTION

I have discovered that so-called fines, either cementitious or non-cementitious, may be substituted for a portion of the cement in a cellular concrete mix such as described and claimed in U.S. Pat. No. 4,900,359 to produce an improved, low cost, cellular concrete which provides a more economical alternative for yielding commercial quantities. As used herein the term "fines" means particles that can pass through a screen no coarser than about 200 mesh. The term "cellular cement mix" is inclusive of a mix as defined in U.S. Pat. No. 4,900,359 and includes Portland cement, or cement and sand, or cement and crushed stone or cement, sand and crushed stone or such mixes with other typical cement mix ingredients with any suitable air-bubble containing foam as well as sufficient water to hydrate the cement mix and sustain the foam. However, these prior art mixes are modified by adding cementitious fines to the cellular concrete mix such as, for example, flyash (Type C or F), slag cement or kiln dust, or non-cementitious fines such as, for example, limestone, silica or granitic fines. This enables the amount of the cement component in the cellular concrete mix to be reduced, the cementitious fines employed being added in an amount not to exceed about 70% of the total weight of cement and cementitious fines, or 50% of the total weight of cement and non-cementitious fines. The preferred ratio of cement to fines is 7:3, and the minimum amount of fines, either cementitious or non-cementitious, should not be below about 10% of the total weight of cement and fines.

The concrete mix also includes an additive which preferably comprises a colloidal suspension (hereinafter referred to as mixture) of sodium bentonite, peptized calcium bentonite or attapulgite with water in a weight ratio of about 1:10 (about 9.1% solids) the ratio of the two respective components can range from about 1:4 (about 20.0% solids) to about 1:20 (about 4.8% solids). The 1:10 mixture is preferred since it forms an extremely stable, non-separating mixture having a viscosity enabling the mixture to be most easily handled that is easily pumped and dispensed. Additionally, such an additive product can be stored for indefinite periods before use without separation occurring. Such a product can even be frozen and when thawed can be used as described herein without requiring any additional mixing or stirring. However, richer additive mixtures, for example, the 1:4 ratio mixture, while too viscous to easily handle through ordinary pumps may still be used where pumping is not required, where special dispensing capabilities are present or can be used as a concentrate in special cases. On the other hand, much leaner additive mixtures, for example, at a 1:20 ratio mixture, are much less viscous and while easily handled require much more additive to be added to the cellular cement mix to achieve the same effect as obtained with the preferred 1:10 ratio mixture. Also, as the 1:20 ratio of components in the additive is approached, the additive mixture tends to show an increasing proportion of separation on standing. However, with stirring of this 1:20 ratio additive before use, it is again rendered homogenous and can be used as discussed.

While any suitable sodium bentonite can be employed in the additive, in the cellular concrete mix formulation and in the process of this invention, it is preferred that granular sodium bentonite having an average particle size ranging from about 20 to 70 mesh (840 micron to 210 micron) be employed. Such a granular sodium bentonite is available as GPG 30 sodium bentonite from American Colloid Company, Industrial Division, of Skokie, Ill. GPG 30 sodium bentonite is preferred since, among other reasons, it causes substantially less dust during handling and mixing.

The sodium bentonite useful in the additive of this invention can be any suitable colloid clay (silicate of alumina) comprised principally of the clay mineral montmorillonite and can generally be in a granular form of any suitable gradation or in a powder form, although as indicated a granular form thereof is preferred. However, even highly milled powdered forms thereof can be employed.

The preferred GPG 30 granular sodium bentonite has the approximate chemical formula $(Al, Fe_{1.67}, Mg_{0.33}) Si_4O_{10}(OH)_2 Na+Ca+ +0.33$ and has a typical analysis (moisture free) of:

| | |
|---|---|
| silicon: | 63.02% as $SiO_2$ |
| alumina: | 21.08% as $Al_2O_3$ |
| iron (ferric): | 3.25% as $Fe_2P_3$ |
| iron (ferrous): | 0.35% as $F_eO$ |
| magnesium: | 2.67% as $MgO$ |
| sodium and potassium: | 2.57% as $Na_2O$ |
| calcium: | 0.65% as $CaO$ |
| crystal water: | 5.64% as $H_2O$ |
| trace elements: | 0.72% |

Any suitable attapulgite can be employed in the additive for the cellular concrete mix formulation and in the process of this invention. Attapulgite is a hydrated aluminum-magnesium silicate $(Mg,Al)_5Si_8O_{22}(OH)_4 \cdot 4-H_2O$. It is preferred that powdered attapulgite be employed as the attapulgite component of this invention, although granular attapulgite may also be employed. As examples of attapulgites found useful in this invention there may be mentioned, for example, attapulgite powder such as X-2059 or Attagel 40, both available from the Minerals and Chemicals Division of Englehard, Edison, N.J., and granular attapulgite such as AEG Granular from American Colloid Company, Industrial Division, Skokie, Ill.

While any suitable peptized calcium bentonite can be employed in the additive for the cellular concrete mix formulation and in the process of this invention, it is preferred that powdered peptized calcium bentonite having an average particle size such that 99% minimum passes through a 200 mesh (74 microns) screen be employed. Such a powdered peptized calcium bentonite is available as Polargel T and Polargel I from American Colloid Company, Industrial Division, of Skokie, Ill.

The peptized calcium bentonite useful in the additive of this invention can be any suitable colloid clay (silicate of alumina) comprised principally of the clay mineral montmorillonite and can generally be in a granular form of any suitable gradation or in a powder form, although as indicated a powdered form thereof is preferred. Calcium bentonite which has not been peptized does not provide a suitable additive according to this invention.

The preparation of the colloidal suspension of sodium bentonite, peptized calcium bentonite or attapulgite additive is described in the aforementioned Gelbman U.S. Pat. No. 4,900,359, the contents of which are hereby incorporated by reference in their entirety.

Additionally, the additive can be any suitable gelled silica based sol-gel composition, such as for example a silica-calcium chloride sol-gel. An especially preferred silica based sol-gel is provided by mixing together a solution of about 21.1 grams of calcium chloride flakes and 300 grams of water with a mixture of about 100 grams 42 degree sodium silicate and 300 grams of water. It will be appreciated, however, that other suitable silica based sol-gel can be similarly provided and employed in this invention.

The additive mixtures of the invention are employed in cellular concrete mixes to provide the improved cellular concrete mix formulations of this invention. Generally it has been found that the use of from about 1 quart to about 36 quarts of the heretofore described additive mixture per cubic yard of cellular concrete mix provides the benefits of this invention as discussed hereinbefore and hereinafter. As little as 1 quart of the additive mixture can be used to provide the benefits of this invention for cellular concrete. More than about 36 quarts of additive can be used per cubic yard of cellular concrete mix, but such large portions of the additive become more expensive and require more mixing time and do not produce increased benefits, and thus are generally uneconomic and wasteful. It is preferred that about 1 to about 16 quarts, most preferably about 2 to about 12 quarts, of the additive mixture per cubic yard of cellular concrete mix be employed for optimum results and optimum economics.

The improved cellular concrete of this invention is produced by addition of the hereinbefore described additive to a cellular concrete mix before the addition of the air-bubble foam composition. That is, the additive is added to and homogeneously mixed with a mixture of either a Portland cement or a cement and sand and/or crushed stone mix, and cementitious or non-cementitious fines to which sufficient water is added to hydrate the mixture, and thereafter a stable foam composition containing multitudes of tiny bubbles necessary to produce a cellular concrete is added to the hydrated mixture. Mixing of all the ingredients is continued until the formed, hydrated mix is uniform. The thus foamed cellular concrete mix is then discharged into suitable setting containers or forms, preferably wide and shallow setting containers, for example mortar tubs, and permitted to set. If the cellular concrete is to be employed as lightweight aggregate, the set cellular concrete material is then broken up if necessary, as by a jack hammer, and is then introduced into a suitable crushing apparatus, such as an impact jaw or roll crusher or front end loader or the like or is subjected to a grinding process and crushed into lumps of lightweight aggregate.

The stable foam composition used to produce the cellular concrete products of this invention is preferably first prepared as a preformed stable foam composition and then subsequently mixed with the hereinbefore described cement mixture containing the fines of this invention, an additive and additional water if needed. Alternatively, the cellular concrete may be formed directly by producing the stable foam in situ by mixing together the hereinbefore described cement mixture containing fines of this invention, an additive, water if necessary and the required amount of components for producing the stable foam in a "whipping" type mixer. The hydrated mixture with additive is then whipped until the desired amount of foaming has been achieved whereupon the foamed mix is discharged into setting containers, permitted to set.

The preformed foam method provides for extremely accurate control of the amount of foam, particularly for large sized batches. Moreover, since the foam has already been preformed in a small batch, such method requires only standard and relatively inexpensive mixing equipment that is readily available in both small and large batch sizes up to 3 cubic yards and in the very large batch sizes of 10 cubic yards or more provided by the already-mixed concrete delivery trucks in wide usage. The in situ method on the other hand requires special, expensive type whipping mixers which are generally very limited in size. It is now preferred that the improved cellular concrete of this invention be produced in a continuous process wherein the fines, the additive and stable foam compositions are continuously added to the hereinbefore described cement or cement and/or sand or crushed stone in a continuous process line for producing concrete. In the presently employed continuous process, the cement and cementitious or non-cementitious fines are fed to a mixing system via a pneumatic feed or a screw auger. A high energy mixing system is employed in which the cement, fines, additive and water are mixed to a smooth slurry. A positive displacement pump continuously withdraws the smooth slurry from the mixing system and foam is injected continuously into the slurry at the discharge head of the pump. Thus a uniform cellular concrete is continuously produced and pumped into molds or into a large bounded area forming a pond. After curing, the molds are disassembled or the large bounded area of cellular concrete is broken up with suitable equipment such as a front end loader and the material is placed in inventory or is immediately crushed into appropriately sized lightweight aggregate.

In the preformed foam batch mix method, the hereinbefore described cement mix containing fines of this invention and an additive is mixed in the usual manner for mixing a conventional batch of concrete, then just a brief time interval before delivery of the batch into a mold or building site, the preformed foam is introduced into the batch being mixed. This brief time interval is of sufficiently short duration to enable the preformed foam to become thoroughly mixed with the batch but not significantly longer than that brief duration, because the mixing agitation does tend to collapse some of the desired air-bubbles. For example, the overall mixing cycle for the batch as a whole may be of the order of about 4 to 6 minutes. Then, for example, the preformed foam is preferred to be introduced into this batch being mixed for the brief time of about 1 to 3 minutes before the end of this overall mixing cycle.

The stable foam compositions for use in this invention may be prepared from any suitable foaming agent (air-bubble foam-making agent) that when suitably mixed and agitated with water produces a foam of small cell structure which foam is stable enough to maintain cell structure without significant collapsing during the setting of the concrete with which it is mixed. As foam-making agents suitable for producing such stable foams according to this invention one can employ any suitable soap and non-soap surfactants or emulsifiers. Any suitable non-soap foam-making agent can be employed including anionic, nonionic, amphoteric, zwitterionic and cationic types.

Examples of suitable soaps are the sodium, potassium, ammonium and alkanol ammonium salts of higher fatty acids (those having 10-20 carbon atoms). Anionic nonsoap surfactants can be exemplified by the alkali metal salts of organic sulfuric reaction products having in their molecular structure an alkyl radical containing from 8-22 carbon atoms and a sulfonic acid or sulfuric acid ester radical (included in the term alkyl is the alkyl portion of higher acyl radicals). Preferred are the sodium, ammonium, potassium or triethanolamine alkyl sulfates, especially those obtained by sulfating the higher alcohols ($C_8$-$C_{18}$ carbon atoms), sodium coconut oil fatty acid monoglyceride sulfates and sulfonates; sodium or potassium salts of sulfuric acid esters of the reaction product of 1 mole of a higher fatty alcohol (e.g., tallow or coconut oil alcohols) and 1 to 12 moles of ethylene oxide; sodium or potassium salts of alkyl phenol ethylene oxide ether sulfate with 1 to 10 units of ethylene oxide per molecule and in which the alkyl radicals contain from 8 to 12 carbon atoms, sodium alkyl glyceryl ether sulfonates; the reaction product of fatty acids having from 10 to 22 carbon atoms esterified with isethionic acid and neutralized with sodium hydroxide; and water soluble salts of condensation products of fatty acids with sarcosine.

Nonionic surfactants can be broadly defined as compounds produced by the condensation of alkylene oxide groups (hydrophilic in nature) with an organic hydrophobic compound, which may be aliphatic or alkyl aromatic in nature. Examples of classes of nonionic surfactants are set forth in detail in the aforementioned Gelbman U.S. Pat. No. 4,900,349.

In addition amphoteric surfactants and cationic surfactants may also be used in the compositions of the present invention are these are also fully described in said Gelbman U.S. Pat. No. 4,900,359.

Many additional nonsoap surfactants are described in McCUTCHEON'S, DETERGENTS AND EMULSIFIERS, 1979 ANNUAL, published by Allured Publishing Corporation, which is incorporated herein by reference.

The above-mentioned surfactants can be used alone or in combination in the foam compositions of the present invention.

Preferably as foam-making agents it is preferred to employ MEARL TM liquid foaming agent, a proteinaceous material compatible with Portland cement, available from Mearl Corporation of Roselle Park, N.J.; IVORY TM dish-liquid, a detergent mixture of anionic and nonionic surfactants with ethyl alcohol as a dispersion ingredient available from the Procter & Gamble Co.; and CALIMULSE TM PRS, an isopropylamine sulfate foaming agent. Especially preferred is MEARL TM liquid foaming agent.

Sufficient foam-making agent is mixed with water to produce the stable foam of small cell structures. An effective foam-making amount, generally from about 2% to about 10% by weight, preferably from about 2½% to about 5%, and most preferably from about 3% to about 3.5% of foam-making agent based on the weight of water is employed. It is to be understood that the optimal amount of foam-making agent will be dependent upon the specific foam-making agent selected for use. The foam-making agent and water are mixed in any suitable mixing vessel to produce the stable foam composition. For example these ingredients can be mixed into foam with multitudes of tiny bubbles therein in a MIXMASTER TM mixer or by mixing in a commercially available foam generator, such as is available from Mearlcrete Corporation of Roselle Park, N.J.

As an example of a stable foam composition suitable for use in producing the improved cellular concrete of this invention there can be mentioned the stable foam produced by suitably mixing 3 grams of MEARL TM liquid foaming agent and 90 milliliters of water. This exemplary stable foam composition has been utilized to prepare exemplary cellular concrete products of this invention. It will be appreciated, however, that any suitable stable foam composition can be employed to produce the cellular concrete products of this invention.

It will be appreciated that by varying the mixed materials ratios, variable yet controlled cellular concrete densities and strengths can be achieved over a relatively wide range of density as measured in pounds per cubic foot. Thus, cellular concrete can be readily designed to fit any particular end use design parameter desired. For example, it is possible to obtain suitable cellular concrete having any desired predetermined bulk density in the range of from about 15 to about 95 lbs/ft$^3$.

The amount of foam employed in the cement or cement mix will be determined by the amount and type other conventional cement or cement mix ingredients employed and the bulk density that one desires to obtain. The less foam one employs generally the higher the bulk density of the product and correspondingly the more foam employed the lower the bulk density of the product. For example, to obtain a cellular concrete having a bulk density of about 95 lb/ft$^3$ one would employ about 10 to 15% foam by volume based on the volume of the total cement mix. To obtain an especially light cellular concrete, such as one with a bulk density of about 15 to 25 lb/ft$^3$, one would employ from about 50 to about 60% by volume of foam based on the total volume of the cement mix.

As examples of the controllable weight ranges of cellular concrete that one can produce according to this invention the following three exemplary mixes are given. Each of the exemplary mixes described hereinafter contains about 2 quarts of the additive, a colloidal sodium bentonite, per cubic yard of concrete mix. Mix I is designed to yield an aggregate of minimum weight, yet still strong enough for use in some structural applications such as steel fireproofing and for partition block. Mixes II and III are designed to yield aggregates of median density.

| COMPONENTS (parts by volume) | MIX I | MIX II | MIX III |
| --- | --- | --- | --- |
| Portland Cement | 0.50 | 0.70 | 0.85 |
| Fines | 0.50 | 0.30 | 0.15 |
| Sand | — | 1.74 | 3 |
| Foam | 2.25 | 2.34 | 2.4 |
| Mixing Water | .59 | .66 | .84 |
| Fresh poured density (lb/ft$^3$) | 39.9 | 69.5 | 69.8 |
| Crushed, graded* aggregate density (lb/ft$^3$)** | 23.4 | 43.0 | 38.0 |

*Aggregates are all −⅜" and graded to duplicate the sieve analysis of a commercially available expanded shale aggregate example.
**All bulk density weights are calculated from "jigged" volumes of material.

As previously indicated, a preferred use for the lightweight concrete hereinbefore described is as an aggregate for concrete. That is to say, while the concrete could be employed without further processing, it is presently preferred to break it up into small chunks and then to use it as an aggregate for another concrete that is formed including such lightweight aggregate. In this preferred use, as already noted, the lightweight concrete is broken up, first to a size that can be handled by a crusher, which breaking up can be done in any suitable well known manner such as by the use of jackhammers. Thereafter the broken up chunks of concrete are placed in a crusher where they are crushed to a satisfactory chunk size. The chunk size to which they are broken up is dependent upon the nature of the end use of the concrete including the lightweight aggregate. The choice of such chunk size is well known to persons of ordinary skill in the art and requires no specific description herein. Thus, for example, if the aggregate is to be employed in the production of lightweight concrete block, then it has been found that the lightweight concrete should be broken up by the crusher to a particle size of $-\frac{1}{2}''$, that is to a size in which the broken up concrete chunks will pass through a $\frac{1}{2}''$ sieve. Then the lightweight aggregate may be mixed with cement and other ingredients to form a lightweight concrete which is poured into suitable block configurations in manners well known to those skilled in the art.

By way of example, two formulations for making concrete block including lightweight aggregate screened to $-\frac{1}{2}''$ are presented below.

EXAMPLE 1

| Cement | 500 lbs |
| Limestone Screenings | 2,650 lbs |
| Aggregate | 1,000 lbs |

EXAMPLE 2

| Cement | 500 lbs |
| Block Sand | 2,800 lbs |
| Aggregate | 1,000 lbs |

After the mix is made in accordance with either of these examples, water is added in an appropriate amount as would be well known to the person of ordinary skill, the watered mix to mixed to render it substantially uniform, and the blocks are formed in a conventional manner. In this way the lightweight concrete of the present invention may be employed.

It should be understood that the preferred embodiments and examples described herein are for illustrative purposes only and are not to be construed as limiting the scope of the present invention which is properly delineated only in the appended claims.

What is claimed is:

1. A cellular concrete mix for the preparation of cellular concrete aggregate comprising:
   (a) cement;
   (b) water;
   (c) an additive comprising a colloidal solution or sol-gel composition selected from the group consisting of suspensions of water-sodium bentonite, water-peptized calcium bentonite, water-attapulgite and a gelled silica based sol-gel;
   (d) fines; and
   (e) a stable small-celled foam composition comprising a foam-making agent,
   the water being present in an amount to hydrate the cement and sustain the foam, the fines being present in an amount between about 10% and 70% of the combined weight of fines and cement, and the additive being present in an amount sufficient to substantially eliminate setting-shrinkage of the cellular concrete and prevent cell coalescing.

2. A cellular concrete mix according to claim 1, further comprising sand.

3. A cellular concrete mix according to claim 1, wherein the fines are cementitious fines selected from the group consisting of flyash (Type F and C), slag cement and kiln dust.

4. A cellular concrete mix according to claim 1, wherein the fines are non-cementitious fines selected from the group consisting of limestone, silica and granitic fines, and the amount by weight of said non-cementitious fines does not exceed about 50% of the combined weight of said cement and non-cementitious fines.

5. A celluar concrete mix according to claim 1, wherein the additive is present in an amount of from about 1 quart to about 36 quarts per cubic yard of cellular concrete mix.

6. A cellular concrete mix according to claim 1, wherein the additive is present in an amount of from about 2 quarts to about 12 quarts per cubic yard of cellular concrete mix.

7. A cellular concrete mix according to claim 1, wherein the additive comprises a collodial suspension of sodium bentonite, peptized calcium bentonite or attapulgite in water in a weight ratio of sodium bentonite, peptized calcium bentonite or attapulgite to water of from about 1:4 to about 1:20.

8. A cellular concrete mix according to claim 5, wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

9. A cellular concrete mix according to claim 6, wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

10. A cellular concrete mix according to claim 1, wherein the weight ratio of the cement to the fines is 7:3.

11. A cellular concrete aggregate produced by the process comprising substantially uniformly mixing together:
   (a) cement;
   (b) water;
   (c) an additive comprising a colloidal solution or sol-gel composition selected from the group consisting of suspensions of water-sodium bentonite, water peptized calcium bentonite, water attapulgite and a gelled silica based sol-gel;
   (d) fines;
and uniformly mixing therewith:
   (e) a stable small-celled foam composition comprising a foam-making agent,
   the water being present in an amount to hydrate the cement and sustain the foam, the fines being present in an amount of between about 10% and 70% by weight of the combined weight of fines and cement, and the additive being present in an amount sufficient to substantially eliminate setting-shrinkage of the cellular concrete and prevent cell coalescing, to form a cellular cement mix and thereafter permitting cellular cement mix to set forming a cellular concrete substantially free of setting-shrinkage and loss of cell integrity due to coalescing of cells.

12. A cellular concrete according to claim 11, wherein the fines are cementitious fines selected from the group consisting of flyash (Type F and C), slag cement and kiln dust.

13. A cellular concrete according to claim 11, wherein the fines are non-cementitious fines selected from the group consisting of limestone, silica and granitic fines.

14. A cellular concrete of claim 11 which is buoyant and floats on the surface of water for at least several months.

15. Lightweight aggregate comprising cellular concrete of claim 11 which has been crushed.

16. A cellular concrete mix for the preparation of cellular concrete aggregate, comprising:
    (a) cement,
    (b) water,
    (c) an additive comprising a gelled silica based sol-gel of silica-calcium chloride,
    (d) fines; and
    (e) a stable small-celled foam composition comprising a foam-making agent,
    the water being present in an amount to hydrate the cement and sustain the foam, the fines being present in an amount of between about 10% and 70% by weight of the combined weight of fines and cement, and the additive being present in an amount sufficient to substantially eliminate setting-shrinkage of the cellular concrete and prevent cell coalescing.

17. A cellular concrete mix according to claim 16, wherein the fines are cementitious fines selected from the group consisting of flyash (Type F and C), slag cement and kiln dust.

18. A cellular concrete mix according to claim 16, wherein the fines are non-cementitious fines selected from the group consisting of limestone, silica and granitic fines, and the amount by weight of said non-cementitious fines does not exceed about 50% of the combined weight of said cement and non-cementitious fines.

19. A cellular concrete mix according to claim 16, wherein the additive is present in an amount of from about 1 quart to about 36 quarts per cubic yard of cellular concrete mix.

20. A cellular concrete mix according to claim 16, wherein the additive is present in an amount of from about 2 quarts to about 12 quarts per cubic yard of cellular concrete mix.

21. A cellular concrete according to claim 11, wherein the additive is present in an amount of from about 1 quart to about 36 quarts per cubic yard of cellular concrete mix.

22. A cellular concrete according to claim 11, wherein the additive is present in an amount of from about 2 quarts to about 12 quarts per cubic yard of cellular concrete mix.

23. A cellular concrete according to claim 11, wherein the additive comprises a colloidal suspension of sodium bentonite, peptized calcium bentonite or attapulgite in water in a weight ratio of sodium bentonite, peptized calcium or attapulgite to water of from about 1:4 to about 1:20.

24. A cellular concrete according to claim 21, wherein the additive comprises a colloidal suspension of sodium bentonite, peptized calcium bentonite or attapulgite in water in a weight ratio of sodium bentonite, peptized calcium bentonite or attapulgite to water of from about 1:4 to about 1:20.

25. A cellular concrete according to claim 22, wherein the additive comprises a colloidal suspension of sodium bentonite, peptized calcium bentonite or attapulgite in water in a weight ratio of sodium bentonite, peptized calcium bentonite or attapulgite to water of from about 1:4 to 1:20.

26. A cellular concrete according to claim 11, wherein the additive is a sol-gel of silica-calcium chloride.

27. A cellular concrete according to claim 21, wherein the additive is a sol-gel of silica-calcium chloride.

28. A cellular concrete according to claim 22, wherein the additive is a sol-gel of silica-calcium chloride.

29. Lightweight aggregate comprising the cellular concrete of claim 21 which has been crushed.

30. Lightweight aggregate comprising the cellular concrete of claim 22 which has been crushed.

31. Lightweight aggregate comprising the cellular concrete of claim 23 which has been crushed.

32. Lightweight aggregate comprising the cellular concrete of claim 24 which has been crushed.

33. Lightweight aggregate comprising the cellular concrete of claim 25 which has been crushed.

34. Lightweight aggregate comprising the cellular concrete of claim 26 which has been crushed.

35. Lightweight aggregate comprising the cellular concrete of claim 27 which has been crushed.

36. Lightweight aggregate comprising the cellular concrete of claim 28 which has been crushed.

* * * * *